June 4, 1968        J. D. CHRISTIAN        3,386,708

APPARATUS FOR TREATING FLOWABLE MATERIALS

Filed Nov. 24, 1965        3 Sheets-Sheet 1

INVENTOR
JOSEPH DENNIS CHRISTIAN
BY
*Young & Thompson*
ATTORNEYS

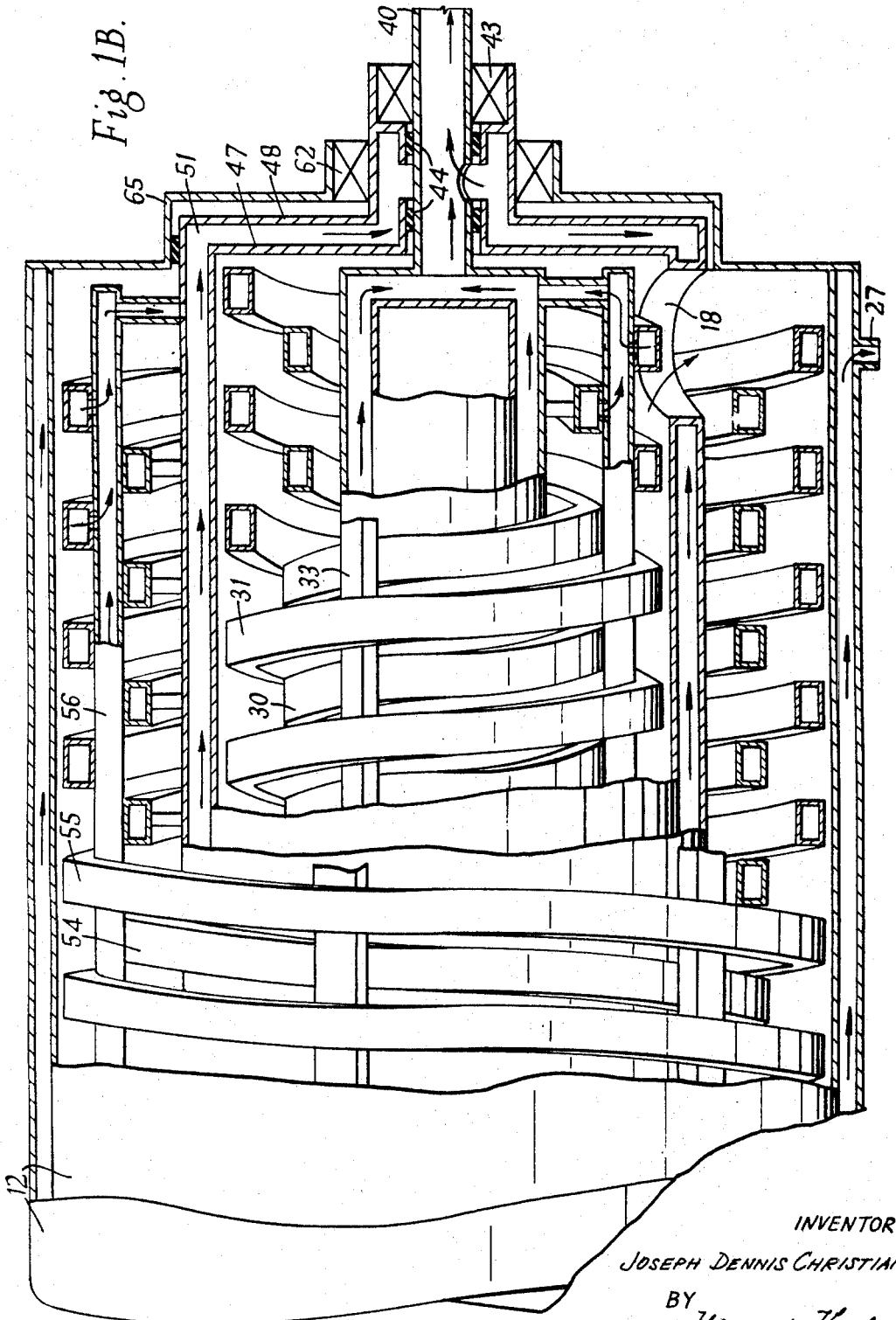

INVENTOR
JOSEPH DENNIS CHRISTIAN
BY
Young & Thompson
ATTORNEYS

United States Patent Office 3,386,708
Patented June 4, 1968

3,386,708
APPARATUS FOR TREATING FLOWABLE MATERIALS
Joseph Dennis Christian, San Francisco, Calif., assignor to Packaged Power Terminals Inc., San Francisco, Calif.
Filed Nov. 24, 1965, Ser. No. 509,522
18 Claims. (Cl. 259—2)

ABSTRACT OF THE DISCLOSURE

This invention provides a heat exchange apparatus comprising three concentric cylinders, the inner two being rotatable and hollow to receive heat exchange fluid and between the inner cylinder and the intermediate cylinder is a double helical device for moving material to be treated in one direction, from one end of the apparatus to the other where the material falls into a space between the intermediate cylinder and the outer cylinder, said space also containing a double helical device for transferring the material back to an outlet at the first end of the apparatus.

---

This invention relates to apparatus for treating flowable materials. The material may be a particulate material or my be in the form of pieces or a soft mass or slurry and may be for example cement or pieces of meat or tomato puree or practically any other substance that can be mixed by helical ribbons.

The apparatus may effect heat exchange between the material and a heat exchange medium which does not contact the material. The heat exchange medium which does not contact the material. The heat exchange medium may for example be steam, hot air, or cold brine. Also the apparatus can be designed to inject a heat exchange medium or other substance into the material or may remove liquid or gas from the material. Also the apparatus can be designed solely for mixing and/or blending ingredients of the material, for example potato shreds with powdered eggs, spices and flavoring. The apparatus may be arranged to carry out, any required combination of these effects.

An important object of the invention is to build in to a given space, a large amount of surface area serving for mixing or heat exchange. Further objects of the invention are to enable the material that is being treated to contact the maximum amount of such surface area to cause the material to be relocated constantly, that is to say, it must be in total continuous motion and no particles resting on any particular area for any great length of time. Another object is to provide maximum uniformity of mixing and blending of the material.

According to the invention the apparatus comprises a first rotatably mounted cylinder, a first tubular helical device (e.g. helical ribbon) surrounding the first cylinder and fixed to it, a second rotatably mounted cylinder surrounding the first helical device, a second tubular helical device surrounding the first ribbon assembly, a third cylinder surrounding the second helical device, the space between the first and second cylinders communicating at one end of the cylinders with the space between the second and third cylinders to form a channel for the material to be treated, means for feeding material into one end of said channel, and means for discharging material from the other end of said channel said cylinders all being concentric. The helical devices or ribbons and/or cylinders may be hollow to receive heat exchange medium. If desired the ribbons and/or cylinders may have openings communicating with the said channels for egress of a substance e.g. steam, air or a fluid chemical preservative to be mixed with the material.

The invention will now be described by way of example with reference to the accompanying drawings wherein:

FIGURES 1A and 1B together form a horizontal sectional view of an apparatus made in accordance with the invention;

Figure 1A:
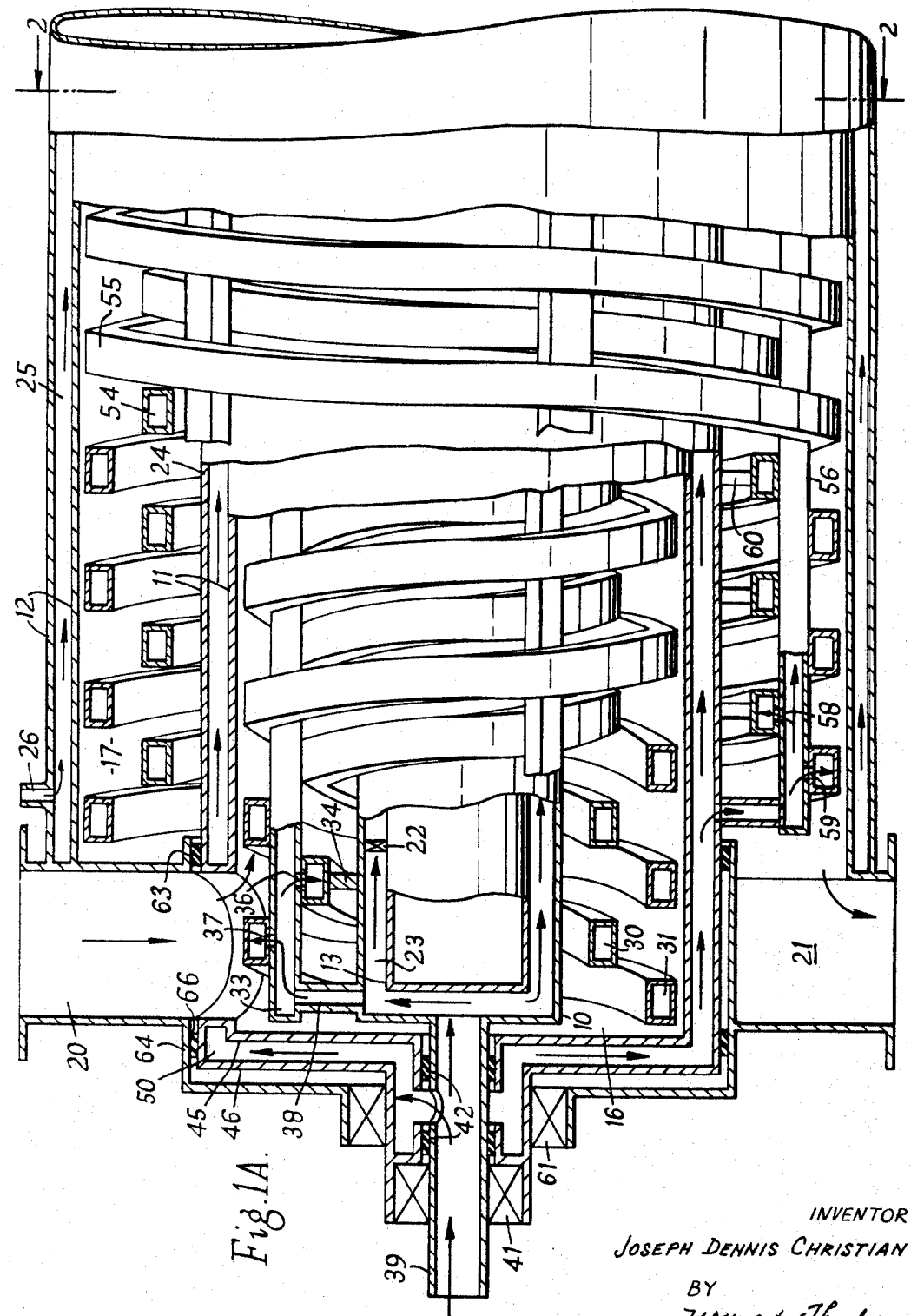
Figure 2:
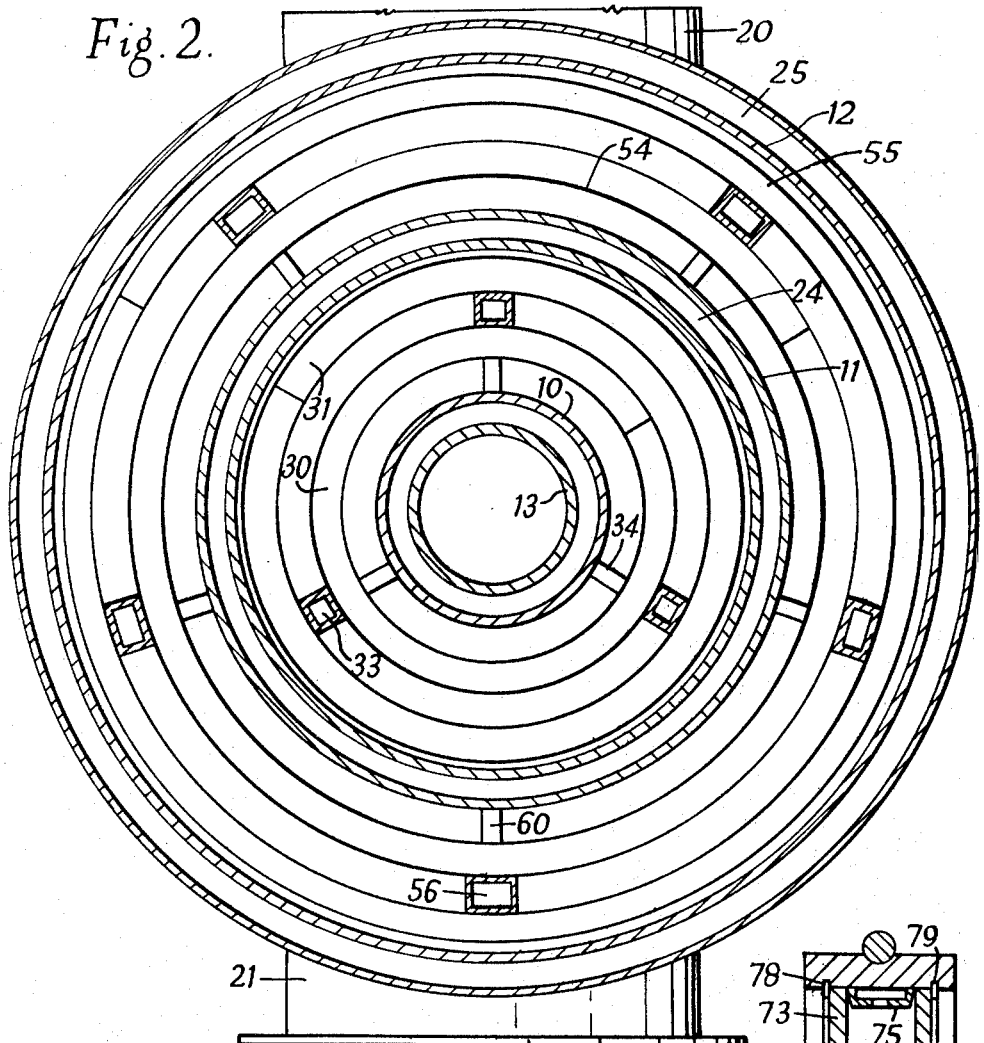
FIGURE 2 is a sectional view on the line 2—2 on FIGURE 1A.

The apparatus shown comprises a first cylinder 10, a second cylinder 11, a third cylinder 12 and a fourth cylinder 13. These cylinders are concentric with each other. Cylinders 10 and 11 are spaced apart to form a space 16 for material to be treated and cylinders 11 and 12 are spaced apart to form a space 17 which communicates by an opening 18 with space 16 so that spaces 16 and 17 together form a channel leading from an inlet tube 20 leading to space 16 to a discharge tube 21 connected with space 17.

The fourth cylinder 13 is mounted by spiders 22 within the first cylinder to form a space 23. Cylinders 11 and 12 are double walled to form spaces 24, 25. Space 25 has an inlet 26 and outlet 27 for heat exchange medium.

In the space 16 is a tubular or hollow helical mixer ribbon assembly consisting of two tubular helices 30, 31. The helix 31 is of larger diameter than helix 30 and each turn of 30 is between two turns of the helix 31, i.e. the turns of 30 are offset from the turns of 31 along the axis. Across the helices 30, 31 along the apparatus are tubular lifting bars 33 for lifting the material. These bars are outside helix 30 and inside helix 31 and are connected to both helices. The helix 30 is also connected by studs 34 to the cylinder 10. Thus the cylinder 10, helices 30, 31, and bars 33 are all fixed together and rotate as a unit.

The helices 30, 31 communicate by apertures 36, 37 with the interior of the tubular bars 33 and the latter communicate by channel 38 with space 23. The cylinder 10 is carried by tubes 39, 40 at its opposite ends and these tubes rotate in bearings 41 and 43 and seals 42 and 44 carried by the double end plates 45, 46 and 47, 48 of the cylinder 11. These double end plates are spaced apart to form spaces 50, 51 which are in communication with the interior of pipes 39, 40 and with the spaces 24.

In the space 17 there is a second tubular helical mixer ribbon assembly consisting of similar inner and outer tubular helices 54, 55 connected to hollow lifting bars 56. The helices communicate by apertures 58, 59 with the hollow bars 56 and are connected thereto and the helix 54 is fixed to the cylinder 11 by studs 60 so that the cylinder 11, helices 54, 55 and bars 56 rotate as a unit independently of the first mixer ribbon assembly. This unit is mounted by bearings 61, 62 on end plates 64, 65 fixed to the cylinder 12.

Heat exchange medium fed to the pipe 39 passes through the spaces, apertures and channels referred to, through all four helices and all the hollow lifting bars and discharges through the pipe 40.

Other seals such as 66, 63 are provided where required.

The helices may be seamless tubes and may be of any shape in section. The ends of the helices are blocked.

In the present design virtually all welding of the helical ribbons is eliminated. The terminals of these ribbons can be secured for rotation either by bolting or riveting or by welding, but there is no welding required intermediate of the ends of the ribbons except the welding that is normally used to make the ribbons continuous spirals, that is, butting one length of tubing to the other and putting on it a circumferential weld so that it can be rolled into a spiral.

The cylinder 11 surrounding the inner ribbon serves as a heat exchange device and it is so designed that the inner surface of it provides heat exchange area to the smaller helices, and the outer surface of it provides heat exchange surface to the larger helices. This cylinder supports and drives the outer ribbons or helices 54, 55 for mixing the material and conveying it along the apparatus.

According to the hand of the inner helices 30, 31 the rotation of the cylinders 10, 11 causes a differential in speed that affects the actual rate at which the material can be conveyed.

The helical devices 30, 31 are shown as being right handed helices. If the cylinder 11 rotates in the same direction as the inner helical device, and, for example, exactly at the same r.p.m. of this inner device, there would be no conveying action whatsoever. The material would just roll around with the cylinder and remain static. As this differential is changed by speeding up or slowing down the cylinder 11, conveying of the material takes place.

Since one helical device is larger than the other, one will run slower than the other and so it is possible by this differential feature to regulate the time of retention and the capacity and adjust the flow of material to compensate for the loss or the addition of moisture or whatever other effects might be had on it from change of density of volume or specific gravity.

The lifting bars are provided so that the material rotates with the helices and slips past the bars that cause this rotation. These bars may also spiral but in a very long pitch. For instance, if the length of the ribbons is 120" these lift blades may have a pitch of about 240". In other words, in one length of 120" they would spiral around the cylinder or the pipe about half way but the twist of that spiral would be opposite to the twist or the hand of the ribbon, so that as the material is lifted, it is also thrown back thus increasing the slippage, which increases the time of retention and permits higher rotational speed for a given volume delivery.

These bars are made out of rectangular tubing, and the outer ribbon or helix is permitted to ride on these bars in such a manner that they can expand or can contract, being only anchored at each end, i.e. there is no welding in between so it is a matter of rolling the coils and on the inner coil, welding on about three of the studs per turn, applying the bars and putting the outer helix over them.

If desired the bars may be spaced away from the helices. This can be done in either of two ways: either by increasing the diameter of the larger helix to make room for this spacing or by reducing the size of the bars and stud welding separation pieces.

If the apparatus is to be used solely for mixing or stirring the material the helices and cylinders need not be hollow.

Figure 3:
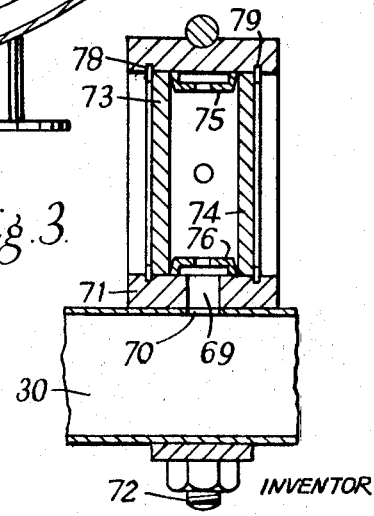
FIGURE 3 is a sectional view of an attachment to be described.

If desired the helices and or cylinders may be provided with one or more openings communicating with the channel 16, 17. This can serve for introducing steam or air or other fluid media into the material or for extracting a fluid from the material. If the pressure in the hollow helices or cylinders is greater than the pressure in the channel 16, 17 the media will flow into the channel whereas if the pressure in the channel 16, 17 is greater than the pressure in the hollow helices or cylinders, fluid will be extracted from the material. To avoid clogging of the openings and to achieve efficient operation, the opening may lead to a distributing device e.g. a porous wall. For example as shown in FIGURE 3 an opening 70 in a helix 30 coincides with a hole 69 in a hollow block 71 that is clamped by U-bolts 72 to the helix. Within the block 71 are two plates 73, 74 of porous material spaced apart by spacers 75, 76 and held in place by snap rings 78, 79. By this means fluid from the helix 30 can escape in diffused condition through the porous plates 73, 74 into the material being treated.

What I claim is:

1. Apparatus for treating flowable material comprising a first rotatably mounted cylinder, a first helical device surrounding the first cylinder and fixed to it, a second rotatably mounted cylinder surrounding the first helical device, a second helical device surrounding the first helical device, a third cylinder surrounding the second helical device, the space between the first and second cylinders communicating at one end of the helical devices with the space between the second and third cylinders to form a channel for the material to be treated, means for feeding material into one end of said channel, and means for discharging material from the other end of said channel, said cylinders all being concentric, wherein the helical devices are hollow and means are provided for feeding a treatment fluid to the interior of said helical devices.

2. Apparatus as claimed in claim 1 having lifting bars attached to the helical devices extending in the axial direction, said bars being hollow and in communication with the interior of the helical devices.

3. Apparatus as claimed in claim 2 wherein at least one of said helical devices consists of two tubular helices one of larger diameter than the other and at least one communicating with the interior of the hollow lifting bars.

4. Apparatus as claimed in claim 2 wherein the helices are staggered in relation to each other along the axis of the apparatus.

5. Apparatus as claimed in claim 2 wherein the first cylinder has an inlet pipe at one end and an outlet pipe at the other end and these pipes communicate with the interior of all the conveyor helices and lifting bars and with the interior of the second cylinder which is double-walled.

6. Apparatus as claimed in claim 1 wherein a fourth cylinder coaxial with the others is located within the first cylinder and provides a space between the first and fourth cylinders that is in communication with the interior of the helices.

7. Apparatus as claimed in claim 1 wherein the first and second helical devices are of oppositely angled threads and are rotated independently of each other.

8. Appaatus as claimed in claim 1 wherein at least one helical device has an opening leading to said channel.

9. Apparatus as claimed in claim 8 wherein the opening communicates with a distributor comprising a porous wall.

10. Apparatus for treating flowable material comprising a housing, a cylinder within the housing and spaced from it to provide a space through which material can flow in one axial direction along the housing, said housing having an inlet and an outlet for material to be treated, a first helical member surrounding the cylinder, a second helical member surrounding the first helical member and of larger diameter, said helical members being of the same hand so as to convey the material in the same direction along the housing, and lifting bars extending along the housing and located between said helical members and fixed to both of them so as to contact the helices of both helical members.

11. Apparatus for treating flowable material comprising a cylindrical housing, a double walled cylinder within the housing and spaced from it to provide a space through which material to be treated can flow in one axial direction along the housing the diameter of the cylinder being at least 60 percent of the diameter of the housing, means for ingress of heat exchange medium into said cylinder between the walls thereof and for egress of said medium therefrom, means for mounting said cylinder rotatably in relation to the housing, a first helical conveyor device in said space and fixed to the cylinder, said device comprising two helical members surrounding the cylinder, one of greater diameter than the other, the helices of one member being offset axially with respect to the helices of the other member, said helical members being of the same conveying direction towards one end of the apparatus, said space being in communication at one end with the interior of the cylinder, lifting bars extending along the cylinder and located between the helical members and fixed to both of said helical members and a second helical device within the cylinder for conveying the material along the cylinder in the opposite direction.

12. Apparatus as claimed in claim 11 having an interior double walled cylinder located centrally within the first-mentioned cylinder and spaced from it to provide a second space between the cylinders along which the material can travel in the opposite direction to the direction of the material in the first space, said second helical device being located within said second space for conveying the material along the second space, said second helical device being fixed to said interior cylinder, and means for supporting said second cylinder rotatably.

13. A heat exchange apparatus comprising means providing a cylindrical space through which material to be treated can flow in one direction, and a helical conveyor device in said space, means for rotatably mounting said helical conveyor device in said space, said helical conveyor device comprising two hollow helical members concentric with said space, one of larger diameter than the other and offset axially from the other, a plurality of hollow lifting bars extending along the space between the helical members and fixed to both of them, the interior of said hollow lifting bars being in communication with the interior of said helical members to form a continuous space therewith, means for introducing heat exchange medium into said continuous space and means for egress of said medium from said continuous space.

14. Apparatus as claimed in claim 10 wherein said space communicates with a second space which is the interior of the cylinder, and a helical device located within said cylinder and attached to it and arranged for conveying the material along the second space in the opposite direction to that of the material in the first space.

15. Apparatus as claimed in claim 10, wherein at least one of the helical members is hollow and means is provided for ingress of heat exchange fluid to the helical member and egress from it.

16. Apparatus as claimed in claim 10, wherein the cylinder is double walled with a space between the walls and means is provided for ingress of heat exchange fluid to this space and egress from it.

17. Apparatus as claimed in claim 10 wherein a helical conveyor is located within the cylinder and fixed to a second cylinder concentric with the first cylinder to rotate therewith and is of opposite hand to that of said helical members, said space being in communication with the interior of the first cylinder at one end of the housing.

18. Apparatus as claimed in claim 10 having a helical conveyor within the cylinder, and another cylinder within the first-mentioned cylinder, said other cylinder carrying the helical conveyor, and means for mounting the two cylinders for rotation independently of each other.

References Cited

UNITED STATES PATENTS

| | | | |
|---|---|---|---|
| 1,628,481 | 5/1927 | Vernay | 34—128 XR |
| 2,153,082 | 4/1939 | Grill et al. | 165—87 XR |
| 2,320,469 | 6/1943 | Rasmussen | 259—25 |
| 2,360,838 | 10/1944 | Atti | 34—128 XR |
| 2,767,962 | 10/1956 | Blackburn | 165—156 XR |
| 3,049,413 | 8/1962 | Sifford | 165—87 XR |

WALTER A. SCHEEL, *Primary Examiner.*

J. M. BELL, *Assistant Examiner.*

Disclaimer 3,386,708.—*Joseph Dennis Christian*, San Francisco, Calif. APPARATUS FOR TREATING FLOWABLE MATERIALS. Patent dated June 4, 1968. Disclaimer filed May 16, 1969, by the assignee *Packaged Power Terminals Inc.*

Hereby enters this disclaimer to claim 14 of said patent.

[*Official Gazette June 24, 1969.*]